(12) United States Patent
Huang

(10) Patent No.: US 6,488,321 B1
(45) Date of Patent: Dec. 3, 2002

(54) POWER SUCKER DEVICE HAVING A RELEASING STRUCTURE

(76) Inventor: Chen Hua Huang, No. 108-24, Chong Chin Road, Bei Tun Chu, Taichung (TW), 406

( * ) Notice: Subject to any disclaimer, the term of this patent is extended or adjusted under 35 U.S.C. 154(b) by 10 days.

(21) Appl. No.: 09/865,633

(22) Filed: May 25, 2001

(51) Int. Cl.[7] .................................................. B25J 15/06
(52) U.S. Cl. ........................................................ 294/64.1
(58) Field of Search .................. 294/64.1, 65; 248/362, 248/363; 269/21

(56) References Cited

U.S. PATENT DOCUMENTS 2,303,393 A * 12/1942 Schmidt ..................... 294/64.1
2,558,479 A * 6/1951 Miller ..................... 294/64.1 X
2,620,217 A * 12/1952 Lenhart ....................... 294/64.1
3,061,351 A * 10/1962 Johnson ....................... 294/64.1
4,583,343 A * 4/1986 Camp ..................... 294/64.1 X
4,593,947 A * 6/1986 Yocum ....................... 294/64.1

* cited by examiner

Primary Examiner—Johnny D. Cherry

(57) ABSTRACT

A power sucker includes a sucker member having a bore formed in the upper portion and having a valve seat. A handle is secured to the upper portion of the sucker member. A tube has a lower piston slidably received in the bore of the sucker member, and biased to engage with the valve seat. A hand grip is secured to the upper portion of the tube for pulling and disengaging the piston away from the valve seat. The tube includes an orifice and one or more openings and one or more air passages for releasing air when the piston is disengaged from the valve seat.

7 Claims, 4 Drawing Sheets

POWER SUCKER DEVICE HAVING A RELEASING STRUCTURE

BACKGROUND OF THE INVENTION

1. Field of the Invention

The present invention relates to a sucker, and more particularly to a power sucker device having a releasing or an air releasing structure.

2. Description of the Prior Art

Typical suckers comprise a sucker body for attaching onto smooth surfaces. The suckers each includes a protrusion or a rod extended outward from the peripheral skirt thereof. The users may pull the rod to disengage the peripheral skirt of the sucker body from the smooth surface in order to release the suckers. When the suckers are made to a great volume or are formed as the power suckers, it will be difficult to release the suckers with the rod.

The present invention has arisen to mitigate and/or obviate the afore-described disadvantages of the conventional suckers.

SUMMARY OF THE INVENTION

The primary objective of the present invention is to provide a power sucker including a releasing or an air releasing structure for easily and quickly releasing the power sucker.

The other objective of the present invention is to provide a power sucker including a hand grip, particularly a peripheral hand grip provided in a peripheral handle for easily releasing the air of the power sucker.

In accordance with one aspect of the invention, there is provided a power sucker comprising a sucker body including a conduit formed therein, and including an upper portion having a bore formed therein and communicating with the conduit, and including a valve seat provided in the upper portion and in the bore thereof, a handle secured to the upper portion of the sucker body, a tube including a lower portion having a piston slidably received in the bore of the sucker body, for engaging with the valve seat and for blocking the bore of the sucker body, the tube including an upper portion extended upward into the handle, means for biasing the piston of the tube to engage with the valve seat, a hand grip secured to the upper portion of the tube for pulling the tube away from the valve seat against the biasing means, and means for releasing air in the conduit of the sucker body when the piston is disengaged from the valve seat.

The sucker body includes a cavity formed in the upper portion thereof, and includes a block secured in the cavity thereof, the block includes the bore formed therein and includes the valve seat provided therein.

The block includes an outer peripheral portion having at least one recess formed therein, the sucker body includes at least one rib extended inward of the cavity thereof and engaged into the recess of the block for securing the block in the sucker body.

The sucker body includes a cylindrical swelling provided on the upper portion thereof; the handle includes a lower portion having a chamber formed therein for receiving the cylindrical swelling of the sucker body.

The air releasing means includes an orifice formed in the tube, at least one passage formed in the piston for communicating with the orifice of the tube, and at least one opening formed in the upper portion of the tube and communicating with the orifice of the tube and the environment.

The piston includes an outer peripheral recess formed therein and communicating with the passage of the piston.

The piston includes a peripheral bulge extended downward therefrom for engaging with the valve seat.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
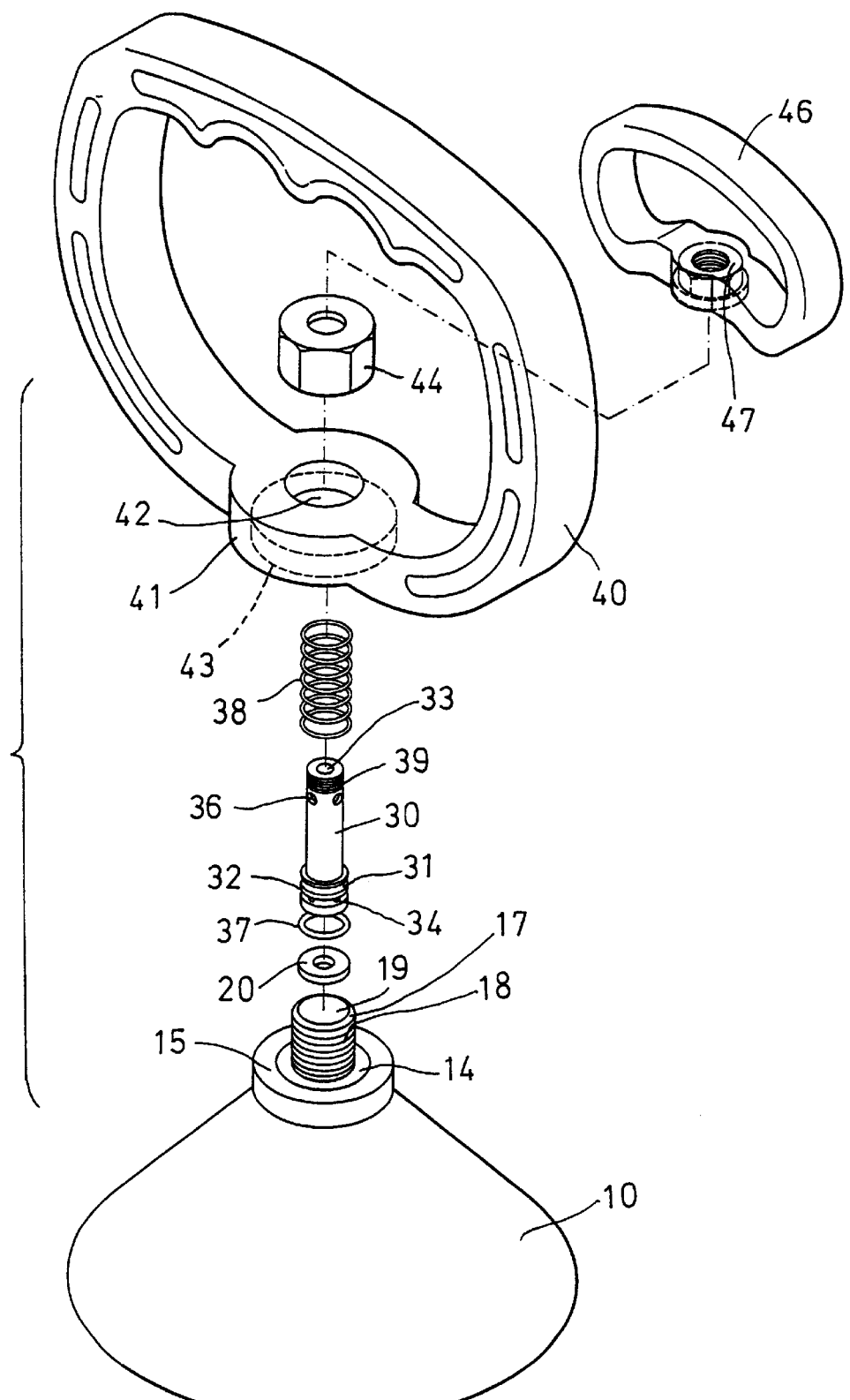
FIG. 1 is an exploded view of a power sucker in accordance with the present invention.

Referring to the drawings, and initially to FIGS. 1–5, a power sucker in accordance with the present invention comprises a sucker body 10 including a cavity 11 formed in the upper portion thereof, and including one or more projections or teeth or, peripheral ribs 12 extended inward of the cavity 11 thereof, and including a cylindrical swelling 15 provided on the upper portion thereof. The sucker body 10 is made of rubber materials or other resilient materials. A block 14 is secured in the cavity 11 of the sucker body 10 and includes an outer thread or one or more holes or recesses 141 formed in the outer peripheral portion thereof for receiving the teeth or the ribs 12 of the sucker body 10 and for securing to the sucker body 10. The block 14 includes an upper portion 17 extended upward beyond the sucker body 10 and includes an outer thread 18 formed thereon, and includes a bore 19 formed therein, and includes a peripheral shoulder or a valve seat 16 formed in the middle portion of the bore 19 thereof. A gasket 20 is received in the bore 19 of the block 14 and engaged with the valve seat 16 of the block 14. The sucker body 10 includes a conduit 101 formed therein and aligning or communicating with the bore 19 of the block 14. The block 14 may also be formed as an integral portion of the sucker body 10 by a molding process, with a material different from that of the sucker body 10, for example.

A tube 30 has a lower portion slidably received in the bore 19 of the block 14, and includes a piston 31 provided or attached to the bottom thereof, and includes a sealing ring 37 engaged on the outer portion of the piston 31 for slidably engaging with the inner peripheral surface of the block 14 and for making a water tight seal between the block 14 and the piston 31. The piston 31 is provided for engaging with the valve seat 16 of the block 14 and for blocking the bore 19 of the block 14. The tube 30 includes an annular recess 32 formed in the outer peripheral portion of the piston 31 and located below the sealing ring 37, and includes an orifice 33 longitudinally formed therein, and includes one or more passages 34 formed in the lower portion thereof and communicating with the orifice 33 and the peripheral recess 32 thereof, and includes one or more openings 36 laterally formed in the upper portion thereof for communicating the upper portion of the orifice 33 of the tube 30 with the outer environment. A spring 38 is engaged on the tube 30 and engaged with the piston 31 for biasing the piston 31 to engage with the valve seat 16 of the block 14. The tube 30 includes an outer thread 39 formed in the upper portion thereof for threading with a lock nut 44.

Figure 4:
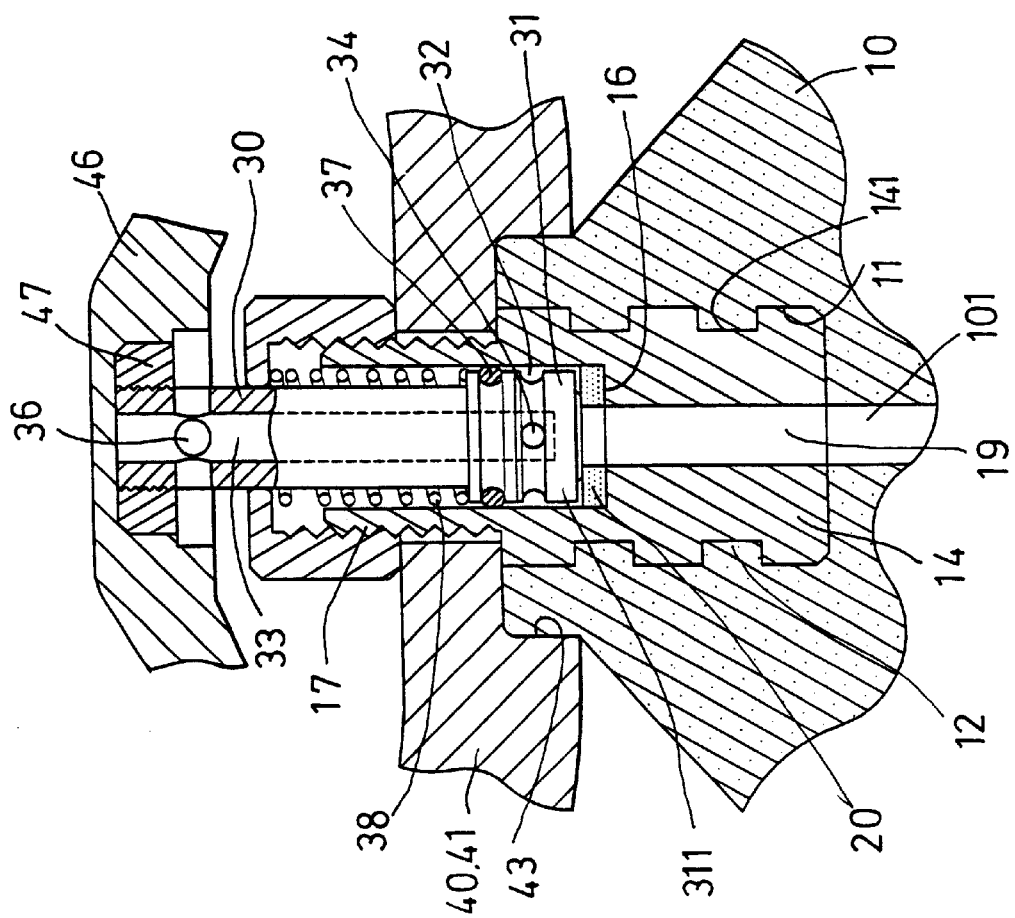
FIG. 4 is an enlarged partial cross sectional view showing the detail structure of the power sucker.
Figure 5:
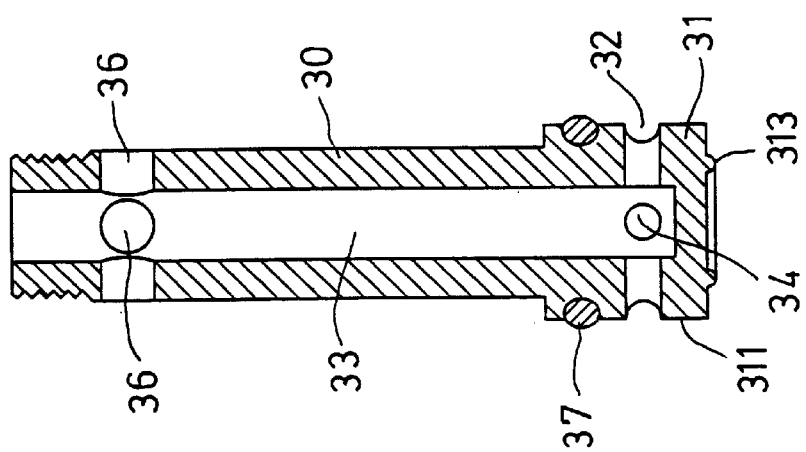
FIG. 5 is an enlarged partial cross sectional view showing a tube of the power sucker.

As best shown in FIG. 4, the piston 31, particularly the lower portion 311 of the piston 31, includes an outer diameter smaller than the inner diameter of the bore 19 of the block 14, such that the air or the fluid may flow bypass the peripheral portion of the lower portion 311 of the piston 31 and may flow into or outward of the orifice 33 via the passages 34 of the tube 30. The air or the fluid may then flow into or out or between the orifice 33 of the tube 30 and the environment via the openings 36 of the tube 30. As shown in FIG. 5, the tube 30 includes a peripheral bulge 313 extended downward from the bottom of the piston 31 for engaging with the gasket 20 or the valve seat 16 and for firmly or effectively engaging with the valve seat 16.

A peripheral or a substantially O-shaped handle 40 includes an enlarged lower portion 41 having a hole 42 and an enlarged chamber 43 formed therein, in which the enlarged chamber 43 is preferably formed in the bottom of the lower portion 41 of the handle 40 for receiving the cylindrical swelling 15 of the sucker body 10. The upper portion of the tube 30 and the upper portion 17 of the block 14 are engaged through the hole 42 of the lower portion 41 of the handle 40. The lock nut 44 is engaged on the lower portion 41 of the handle 40 and threaded to the outer thread 18 of the block 14 for solidly securing the handle 40 to the sucker body 10. The spring 38 is engaged between the lock nut 44 and the piston 31 for biasing the piston 31 to engage with the valve seat 16 of the block 14. A hand grip 46 is received in the handle 40 and includes an inner thread or a lock nut 47 disposed in the lower portion thereof for threading with the outer thread 39 of the tube 30 and for securing to the upper portion of the tube 30, and for moving or pulling the tube 30 upward relative to the sucker body 10 and away from the valve seat 16 of the sucker body 10, against the spring 38, for disengaging the piston 31 of the tube 30 away from the valve seat 16.

The hand grip 46 is also preferably peripheral or circular or includes a substantially O-shape, for allowing the hand grip 46 to be easily and comfortably pulled by the user relative to the handle 40.

Figure 3:
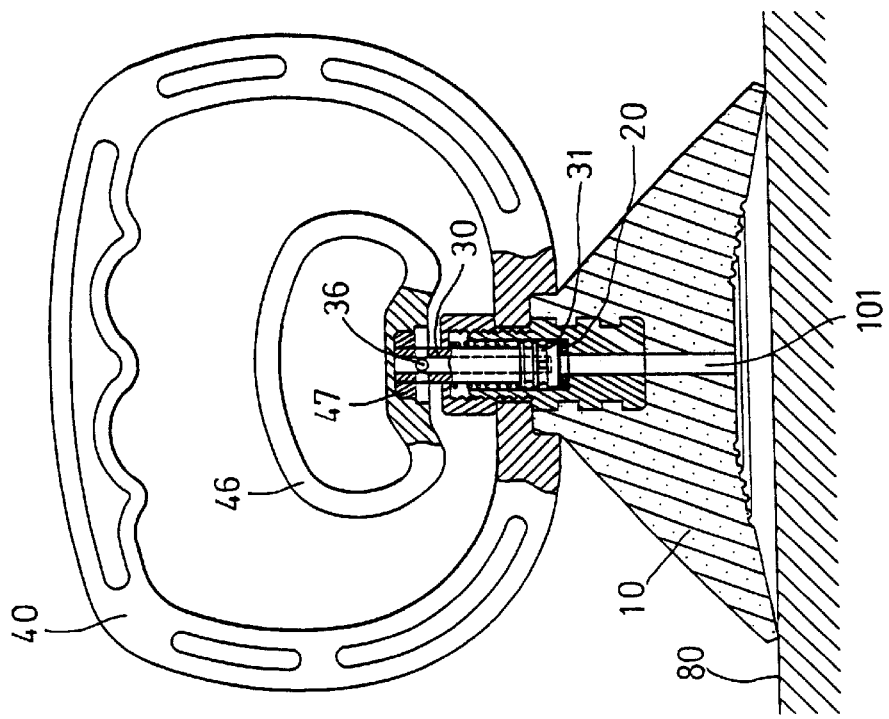
FIG. 3 is a cross sectional view taken along lines 3—3 of FIG. 2.
Figure 2:
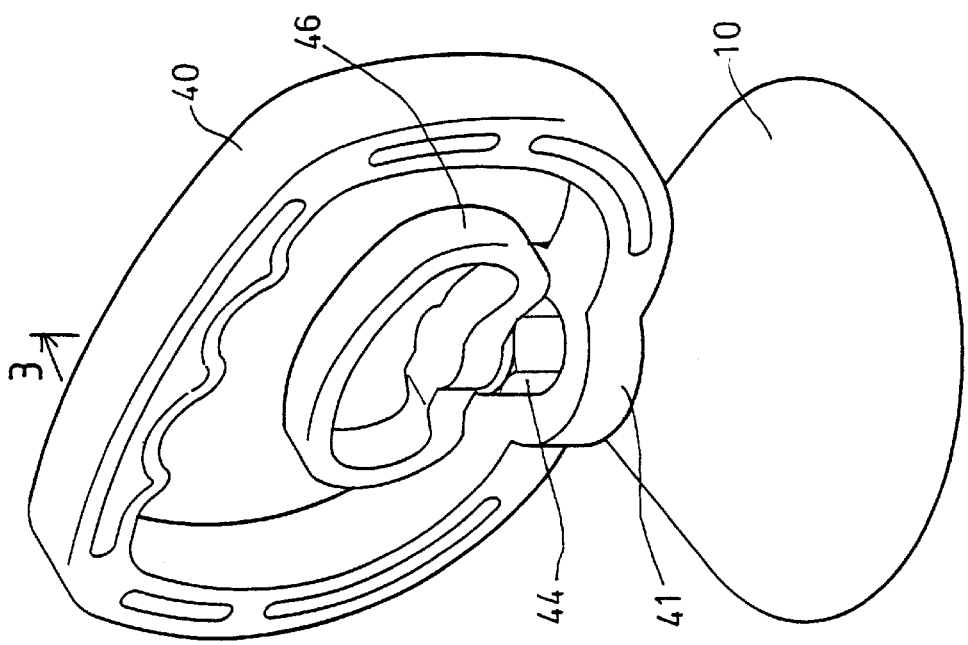
FIG. 2 is a perspective view of the power sucker.
Figure 6:
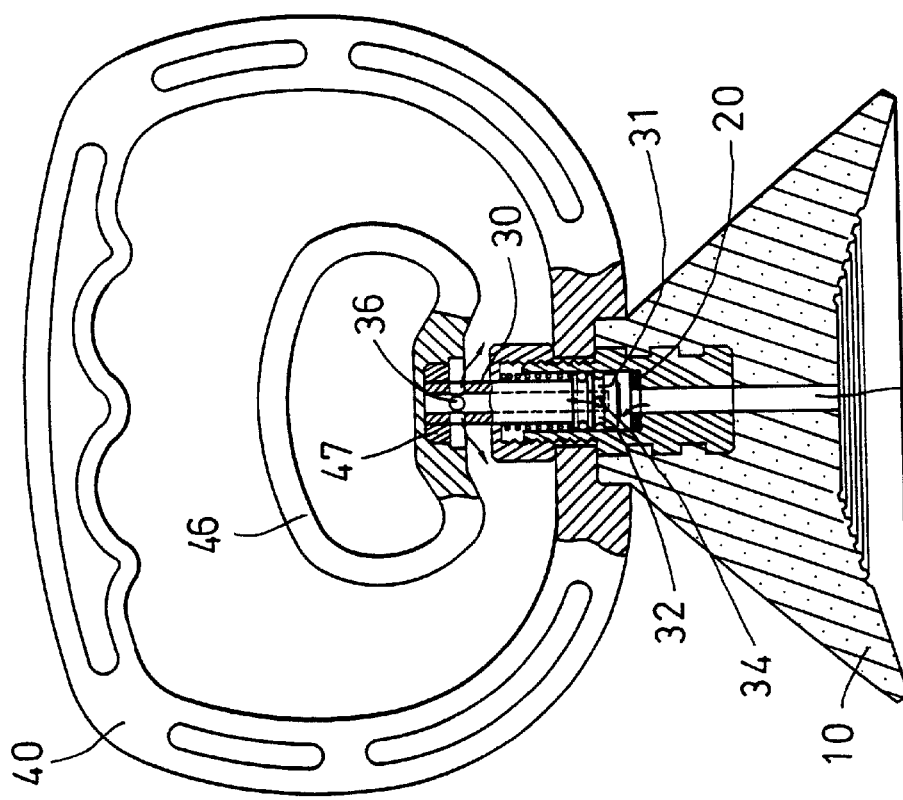
FIG. 6 is a cross sectional view similar to FIG. 3, illustrating the operation of the power sucker.

In operation, as shown in FIGS. 3 and 4, the spring 38 may bias the piston 31 to engage with the valve seat 16 of the block 14 and to block the bore 19 of the block 14. As shown in FIG. 6, when the hand grip 46 is pulled by the user, the tube 30 and thus the piston 31 may be pulled and moved upward away from the sucker body 10 and thus may be pulled away from the valve seat 16 of the sucker body 10, against the spring 38, such that the piston 31 of the tube 30 may be disengaged or pulled away from the valve seat 16.

As shown in FIG. 3 again, when the sucker body 10 is forced against a surface 80, the air in the sucker body 10 may be forced through the conduit 101 of the sucker body 10 and may be forced into the bore 19 of the block 14, and then may force the piston 31 away from the valve seat 16 of the block 14, such that the air may be released or may flow out through the peripheral recess 32 and the orifice 33 of the tube 30, and may flow out to the environment via the openings 36 of the tube 30. When the sucker device is released, a vacuum force may be generated in the sucker body 10, and the piston 31 may be drawn to engage with the valve seat 16 of the block 14 and to block the bore 19 of the block 14. The spring 38 may also force the piston 31 to engage with the valve seat 16 of the block 14.

When the hand grip 46 is pulled by the user, as shown in FIG. 6, the piston 31 may be disengaged from the valve seat 16 of the sucker body 10, against the spring 38, such that the air may flow into the orifice 33 of the tube 32 via the openings 36 of the tube 30, and may then flow into the sucker body via the passages 34 and the peripheral recess 32 of the tube 30, and may flow through the bore 19 of the block 14 and the conduit 101 of the sucker body 10, such that the sucker body may be easily released by pulling the hand grip 46 relative to the handle 40.

Accordingly, the power sucker in accordance with the present invention includes a releasing or an air releasing structure for easily and quickly releasing the power sucker.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A power sucker comprising:
   a sucker body including a conduit formed therein, and including an upper portion having a bore formed therein and communicating with said conduit, and including a valve seat provided in said upper portion and in said bore thereof,
   a handle secured to said upper portion of said sucker body,
   a tube including a lower portion having a piston slidably received in said bore of said sucker body, for engaging with said valve seat and for blocking said bore of said sucker body, said tube including an upper portion extended upward into said handle,
   means for biasing said piston of said tube to engage with said valve seat,
   a hand grip secured to said upper portion of said tube for pulling said tube away from said valve seat against said biasing means, and
   means for releasing air in said conduit of said sucker body when said piston is disengaged from said valve seat.

2. The power sucker according to claim 1, wherein said sucker body includes a cavity formed in said upper portion thereof, and includes a block secured in said cavity thereof, said block includes said bore formed therein and includes said valve seat provided therein.

3. The power sucker according to claim 2, wherein said block includes an outer peripheral portion having at least one recess formed therein, said sucker body includes at least one rib extended inward of said cavity thereof and engaged into said at least one recess of said block for securing said block in said sucker body.

4. The power sucker according to claim 1, wherein said sucker body includes a cylindrical swelling provided on said upper portion thereof, said handle includes a lower portion having a chamber formed therein for receiving said cylindrical swelling of said sucker body.

5. The power sucker according to claim 1, wherein said air releasing means includes an orifice formed in said tube, at least one passage formed in said piston for communicating with said orifice of said tube, and at least one opening formed in said upper portion of said tube and communicating with said orifice of said tube and the environment.

6. The power sucker according to claim 5, wherein said piston includes an outer peripheral recess formed therein and communicating with said at least one passage of said piston.

7. The power sucker according to claim 1, wherein said piston includes a peripheral bulge extended downward therefrom for engaging with said valve seat.

* * * * *